(12) United States Patent
Kalkunte et al.

(10) Patent No.: US 7,830,892 B2
(45) Date of Patent: Nov. 9, 2010

(54) VLAN TRANSLATION IN A NETWORK DEVICE

(75) Inventors: Mohan Kalkunte, Sunnyvale, CA (US); Venkateshwar Buduma, San Jose, CA (US); Song-Huo Yu, Saratoga, CA (US); Gurumurthy Yelewarapu, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 956 days.

(21) Appl. No.: 11/289,370

(22) Filed: Nov. 30, 2005

(65) Prior Publication Data
US 2006/0114915 A1 Jun. 1, 2006

Related U.S. Application Data

(60) Provisional application No. 60/631,548, filed on Nov. 30, 2004, provisional application No. 60/686,402, filed on Jun. 2, 2005.

(51) Int. Cl.
*H04L 12/56* (2006.01)
*G06F 15/177* (2006.01)

(52) U.S. Cl. .................................. 370/395.53; 709/220

(58) Field of Classification Search ........................ None
See application file for complete search history.

(56) References Cited

U.S. PATENT DOCUMENTS

| | | | |
|---|---|---|---|
| 6,041,042 A | 3/2000 | Bussiere | |
| 6,335,932 B2 | 1/2002 | Kadambi et al. | |
| 6,496,502 B1 | 12/2002 | Fite, Jr. et al. | |
| 6,535,510 B2 | 3/2003 | Kalkunte et al. | |
| 6,674,743 B1 | 1/2004 | Amara et al. | |
| 6,792,502 B1 | 9/2004 | Pandya et al. | |
| 6,804,233 B1 | 10/2004 | Congdon et al. | |
| 6,807,179 B1 | 10/2004 | Kanuri et al. | |
| 6,963,921 B1 | 11/2005 | Yang et al. | |
| 6,993,026 B1 | 1/2006 | Baum et al. | |
| 7,020,139 B2 | 3/2006 | Kalkunte et al. | |
| 7,031,304 B1 | 4/2006 | Arberg et al. | |
| 7,054,315 B2 | 5/2006 | Liao | |
| 7,089,240 B2 | 8/2006 | Basso et al. | |
| 7,127,566 B2 | 10/2006 | Ramakrishnan et al. | |
| 7,139,753 B2 | 11/2006 | Bass et al. | |
| 7,161,948 B2 | 1/2007 | Sampath et al. | |
| 7,292,567 B2 | 11/2007 | Terrell et al. | |
| 7,292,573 B2 | 11/2007 | LaVigne et al. | |
| 7,313,135 B2 | 12/2007 | Wyatt | |
| 7,327,748 B2 | 2/2008 | Montalvo et al. | |

(Continued)

OTHER PUBLICATIONS

Non-Final Office Action received for U.S. Appl. No. 12/135,720 mailed on Mar. 19, 2009, 8 pages.

(Continued)

*Primary Examiner*—Ricky Ngo
*Assistant Examiner*—Clemence Han

(57) ABSTRACT

A network device for implementing VLAN translation on a packet. The network device includes a user network interface port for receiving and transmitting packets to customers of a network. The network device also includes a network to network interface port for communicating with a second network device in the network. A packet received at the user network interface port is classified, translated based on a predefined provider field associated with the packet, and encapsulated with a tag that is removed when the packet is transmitted from the user network interface port to a customer.

19 Claims, 6 Drawing Sheets

U.S. PATENT DOCUMENTS

| | | | |
|---|---|---|---|
| 7,359,383 B2 | 4/2008 | Wakumoto et al. | |
| 7,382,787 B1 | 6/2008 | Barnes et al. | |
| 7,408,932 B2 | 8/2008 | Kounavis et al. | |
| 7,408,936 B2 | 8/2008 | Ge et al. | |
| 7,417,990 B2 | 8/2008 | Ikeda et al. | |
| 7,499,456 B2 | 3/2009 | De Silva et al. | |
| 7,515,610 B2 | 4/2009 | Amagai et al. | |
| 7,525,919 B2 | 4/2009 | Matsui et al. | |
| 7,570,639 B2 | 8/2009 | Kalkunte et al. | |
| 7,680,107 B2 | 3/2010 | Kalkunte | |
| 2002/0010791 A1 | 1/2002 | Kalkunte et al. | |
| 2002/0126672 A1 | 9/2002 | Chow et al. | |
| 2005/0008009 A1* | 1/2005 | Chen et al. | 370/360 |
| 2005/0013306 A1* | 1/2005 | Albrecht | 370/395.53 |
| 2005/0018693 A1* | 1/2005 | Dull | 370/396 |
| 2005/0083885 A1 | 4/2005 | Ikeda et al. | |
| 2005/0129019 A1 | 6/2005 | Cheriton | |
| 2005/0138149 A1* | 6/2005 | Bhatia | 709/220 |
| 2005/0163102 A1* | 7/2005 | Higashitaniguchi et al. | 370/351 |
| 2005/0180391 A1* | 8/2005 | Shimada | 370/351 |
| 2005/0190773 A1* | 9/2005 | Yang et al. | 370/395.53 |
| 2006/0002393 A1 | 1/2006 | Lappin et al. | |
| 2006/0039383 A1* | 2/2006 | Ge et al. | 370/396 |
| 2006/0114876 A1 | 6/2006 | Kalkunte | |
| 2006/0114901 A1 | 6/2006 | Kalkunte et al. | |
| 2006/0114908 A1 | 6/2006 | Kalkunte et al. | |
| 2006/0114938 A1 | 6/2006 | Kalkunte et al. | |
| 2006/0140130 A1 | 6/2006 | Kalkunte et al. | |
| 2006/0182034 A1 | 8/2006 | Klinker et al. | |
| 2007/0110078 A1* | 5/2007 | De Silva et al. | 370/395.53 |
| 2008/0095062 A1 | 4/2008 | Shankar et al. | |
| 2008/0117913 A1 | 5/2008 | Tatar et al. | |

OTHER PUBLICATIONS

Notice of Allowance Received for U.S. Appl. No. 11/289,499, mailed on Apr. 3, 2009, 16 pages.
Non-Final Office Action Received for U.S. Appl. No. 11/289,499, mailed on Oct. 15, 2008, 12 pages.
Non-Final Office Action Received for U.S. Appl. No. 11/289,368, mailed on Mar. 19, 2009, 9 pages.
Non-Final Office Action Received for U.S. Appl. No. 11/289,369, mailed on Mar. 18, 2009, 19 pages.
Non-Final Office Action Received for U.S. Appl. No. 11/289,366, mailed on May 11, 2009, 9 pages.
Non-Final Office Action Received for U.S. Appl. No. 11/289,366, mailed on Oct. 27, 2008, 11 pages.
Non-Final Office Action Received for U.S. Appl. No. 11/289,497, mailed on Oct. 15, 2008, 13 pages.
Final Office Action Received for U.S. Appl. No. 11/289,497, mailed on Mar. 18, 2009, 13 pages.
Notice of Allowance Received for U.S. Appl. No. 11/289,497, mailed on Jun. 12, 2009, 12 pages.
Final Office Action Received for U.S. Appl. No. 11/289,687, mailed on Jun. 30, 2009, 11 pages.
Non-Final Office Action Received for U.S. Appl. No. 11/289,687, mailed on Dec. 24, 2008, 9 pages.
Non-Final Office Action Received for U.S. Appl. No. 11/289,687, mailed on Aug. 5, 2008, 10 pages.
Notice of Allowance received for U.S. Appl. No. 11/289,368, mailed on Sep. 15, 2009, 17 pages.
Office Action received for U.S. Appl. No. 11/289,369, mailed on Oct. 13, 2009, 33 pages.
Office Action received for U.S. Appl. No. 11/289,497, mailed on Oct. 15, 2008, 13 pages.
Office Action received for U.S. Appl. No. 11/289,497, mailed on Mar. 18, 2009, 13 pages.
Supplemental Notice of Allowability received for U.S. Appl. No. 11/289,497, mailed on Sep. 21, 2009, 17 pages.
Supplemental Notice of Allowability received for U.S. Appl. No. 11/289,497, mailed on Dec. 24, 2009, 17 pages.
U.S. Appl. No. 11/289,366 Non-Final Office Action mailed Jul. 6, 2010, 18 pages.

* cited by examiner

VLAN TRANSLATION IN A NETWORK DEVICE

CROSS-REFERENCE TO RELATED APPLICATIONS

This application claims priority of U.S. Provisional Patent Application Ser. No. 60/631,548, filed on Nov. 30, 2004, and U.S. Provisional Patent Application Ser. No. 60/686,402, filed on Jun. 2, 2005. The subject matter of these earlier filed applications is hereby incorporated by reference.

BACKGROUND OF THE INVENTION

Field of the Invention

The present invention relates to a network device in a data network and more particularly to a system and method of mapping multiple packets for multiple customers associated with a service provider to a single tunnel.

A packet switched network may include one or more network devices, such as an Ethernet switching chip, each of which includes several modules that are used to process information that is transmitted through the device. Specifically, the device includes an ingress module, a Memory Management Unit (Mh4I-J) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

A service provider may use one or more network devices to provide services to multiple customers, wherein each customer transmits packets requiring one or more services. As part of the management of the network device, packets requesting the same services need to be classified and processed in a way that reduces network bottleneck. Prior network devices associated a unique service provider identifier with each classification. This enabled the network devices to map several packets to the service provider identifier and to provide the appropriate services to the packets without individually examining each packet. As the packets entered into the network device, the service provider identifier was inserted into each packet.

In order to provide the proper services to customers of service providers, often the packet flow needs to be monitored to determine if the network device is functioning properly. In prior art devices, the packets being sent to a given port could be "mirrored" to another port where the packet flow could be examined. The mirroring process is important in that the flow of the packets to a given destination port need not be interrupted to examine the flow to that destination port. Therefore, in these devices, the packets that were received by a "mirrored-to" port were examined at the latter port with no disruption to the flow of packets to the actual destination port.

As such, in devices where the service provider identifier is inserted into the packet, the packet that is mirrored is modified as a consequence of the inserted service provider identifier. Thus, if a packet received at a given port of a network device is forwarded to another port, the header is modified by the receiving port when the service provider identifier is inserted into the packet. However, if the receiving port is supposed to transmit the unmodified packet to a destination port, after inserting the service provider identifier, the packet that is forwarded to the destination port is indeed a modified packet. This can be a problem if a copy of the received packet is what is needed at a given destination port, such as the mirrored-to port.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
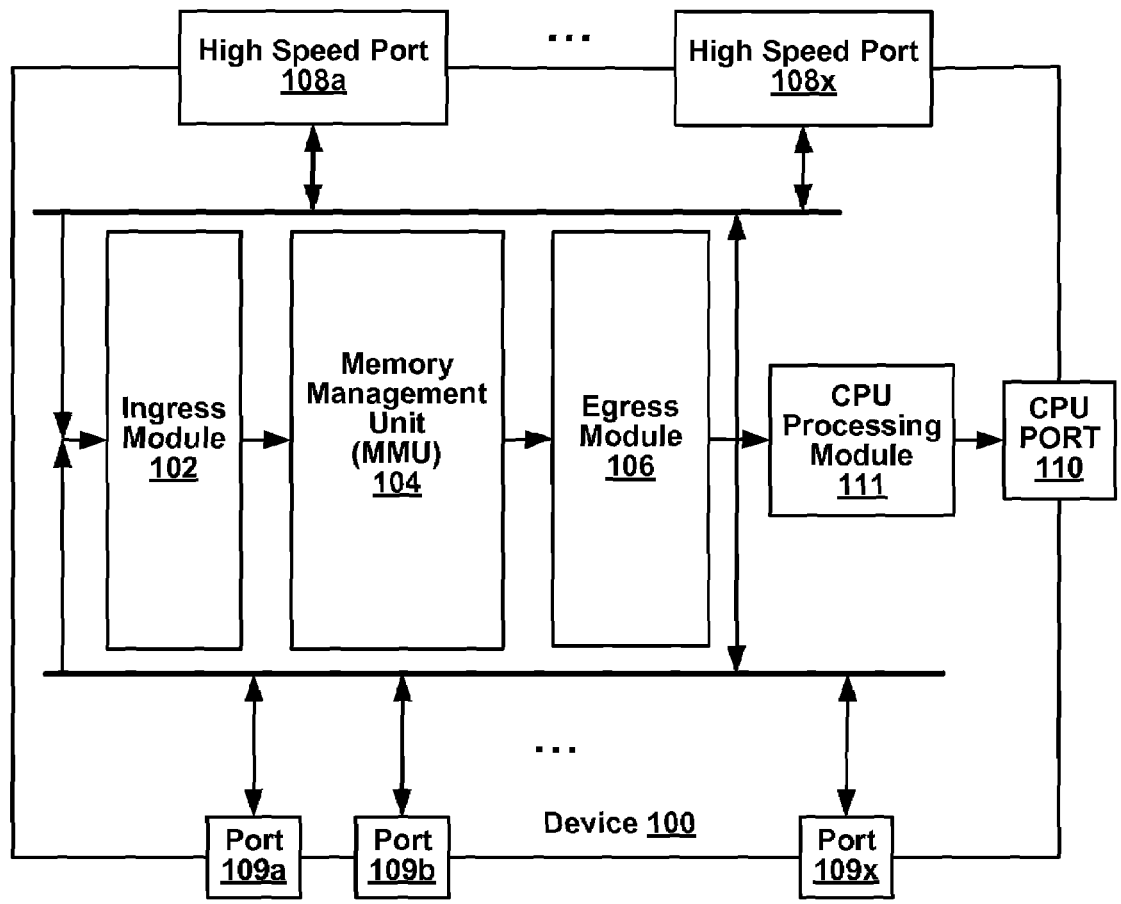
FIG. 1 illustrates a network device in which an embodiment of the present invention may be implemented.

FIG. 1 illustrates a network device, such as a switching chip, in which an embodiment the present invention may be implemented. Device 100 includes an ingress module 102, a MMU 104, and an egress module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and Egress module 106 implements multiple cycles for processing instructions generated by that module. Device 100 implements a pipelined approach to process incoming packets. The device 100 has the ability of the pipeline to process, according to one embodiment, one packet every clock cycle. According to one embodiment of the invention, the device 100 includes a 133.33 MHz core clock. This means that the device 100 architecture is capable of processing 133.33M packets/sec.

Device 100 may also include one or more internal fabric high speed ports, for example a HiGig™, high speed port 108a-108x, one or more external Ethernet ports 109a-109x, and a CPU port 110. High speed ports 108a-108x are used to interconnect various network devices in a system and thus form an internal switching fabric for transporting packets between external source ports and one or more external destination ports. As such, high speed ports 108a-108x are not externally visible outside of a system that includes multiple interconnected network devices. CPU port 110 is used to send and receive packets to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC, which interfaces with a PCI bus that connects device 100 to an external CPU.

Network traffic enters and exits device 100 through external Ethernet ports 109a-109x. Specifically, traffic in device 100 is routed from an external Ethernet source port to one or more unique destination Ethernet ports 109a-109x. In one embodiment of the invention, device 100 supports physical Ethernet ports and logical (trunk) ports. A physical Ethernet port is a physical port on device 100 that is globally identified by a global port identifier. In an embodiment, the global port identifier includes a module identifier and a local port number that uniquely identifies device 100 and a specific physical port. The trunk ports are a set of physical external Ethernet ports that act as a single link layer port. Each trunk port is assigned a global a trunk group identifier (TGID). According to an embodiment, device 100 can support up to 128 trunk ports, with up to 8 members per trunk port, and up to 29 external physical ports. Destination ports 109a-109x on device 100 may be physical external Ethernet ports or trunk ports. If a destination port is a trunk port, device 100 dynamically selects a physical external Ethernet port in the trunk by using a hash to select a member port. The dynamic selection enables device 100 to allow for dynamic load sharing between ports in a trunk.

Once a packet enters device 100 on a source port 109a-109x, the packet is transmitted to ingress module 102 for processing. Packets may enter device 100 from a XBOD or a GBOD. In this embodiment, the XBOD is a block that has one 10 GE/12G MAC and supports packets from high speed ports 108a-108x. The GBOD is a block that has 12 10/100/1G MAC and supports packets from ports 109a-109x.

Figure 2:
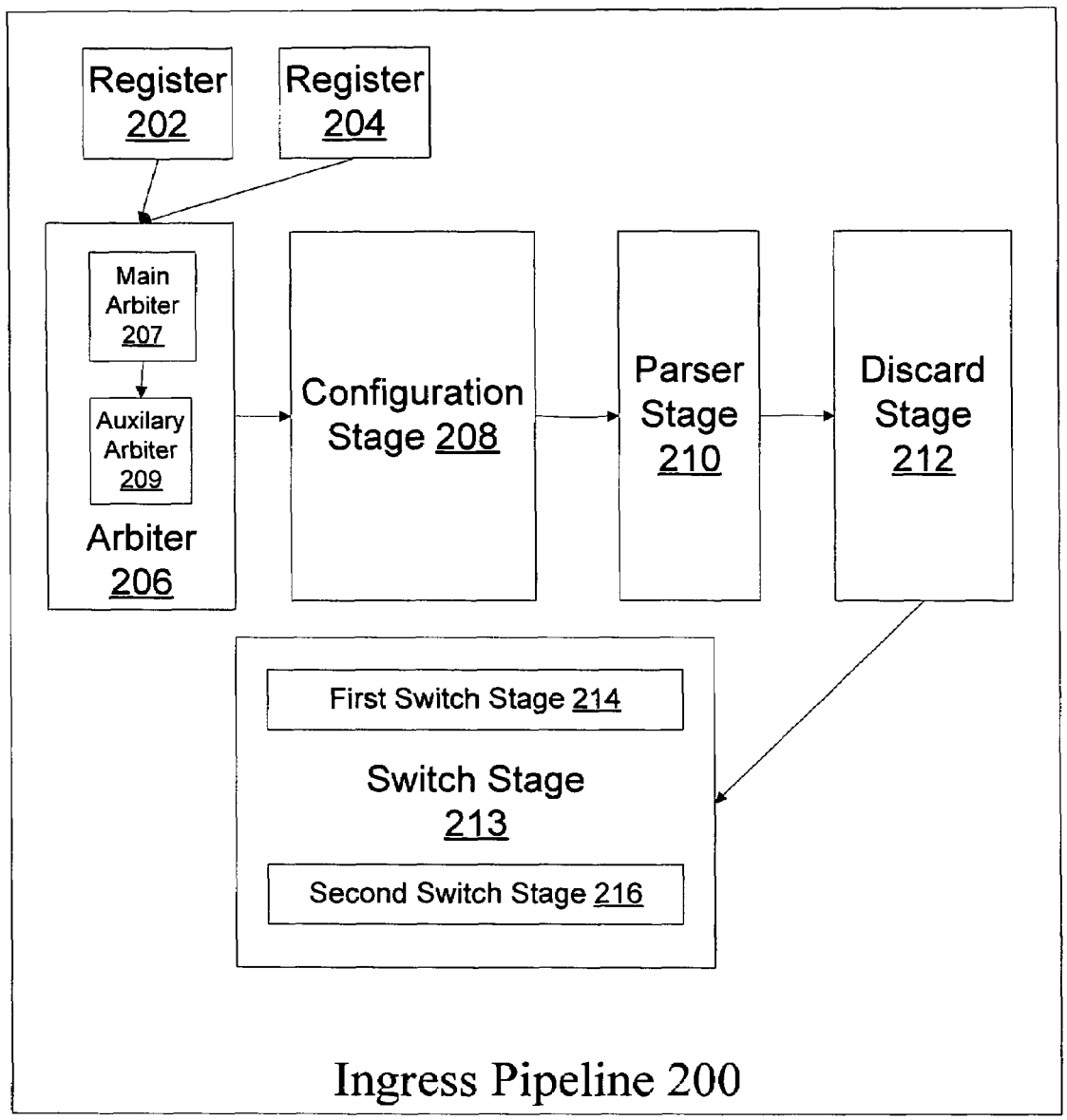
FIG. 2 illustrates a centralized ingress pipeline architecture, according to one embodiment of the present invention.

FIG. 2 illustrates a centralized ingress pipeline architecture 200 of ingress module 102. Ingress pipeline 200 processes incoming packets, primarily determines an egress bitmap and, in some cases, figures out which parts of the packet may be modified. Ingress pipeline 200 includes a data holding register 202, a module header holding register 204, an arbiter 206, a configuration stage 208, a parser stage 210, a discard stage 212 and a switch stage 213. Ingress pipeline 200 receives data from the XBOD, GBOD or CPU processing module 111 and stores cell data in data holding register 202. Arbiter 206 is responsible for scheduling requests from the GBOD, the XBOD and CPU. Configuration stage 208 is used for setting up a table with all major port-specific fields that are required for switching. Parser stage 210 parses the incoming packet and a high speed module header, if present, handles tunnelled packets through Layer 3 (L3) tunnel table lookups, generates user defined fields, verifies Internet Protocol version 4 (IPv4) checksum on outer IPv4 header, performs address checks and prepares relevant fields for downstream lookup processing. Discard stage 212 looks for various early discard conditions and either drops the packet and/or prevents it from being sent through pipeline 200. Switching stage 213 performs all switch processing in ingress pipeline 200, including address resolution.

Ingress module 102 then transmits the packet to MMU 104 which applies all resource accounting and aging logic to packet 200. Specifically MMU 104 uses a source port number to perform resource accounting. Thereafter, MMU 104 forwards the packet to egress module 106.

Upon receiving the packet from MMU 104, egress module 106 supports multiple egress functions for a 72 gigabyte port bandwidth and a CPU processing bandwidth. According to one embodiment, the egress module 106 is capable of handling more than 72 Gig of traffic, i.e., 24 one GE port, 4 high speed ports (12G) and a CPU processing port of 0.2 GE. The egress module 106 receives original packets, as inputted from Ethernet ports 109a-109x, from MMU 104, and may either transmit modified or unmodified packets to destination ports 109a-109x. According to one embodiment of the invention, all packet modifications within device 100 are made in egress module 106 and the core processing of egress module 106 is capable of running faster than the processing of destination ports 109a-109x. Therefore, egress module 106 provides a stall mechanism on a port basis to prevent ports 109a-109x from becoming overloaded and thus services each port based on the speed of the port.

In an embodiment of the invention, the egress module 106 is connected to the MMU 104 by a 1024 bit data interface and all packets transmitted from the MMU 104 pass through egress module 106. Specifically, the MMU 104 passes unmodified packet data and control information to egress module 106. The control information includes the results of table lookups and switching decisions made in ingress module 102. The data bus from MMU 106 is shared across all ports 108 and 109 and the CPU processing 111. As such, the bus uses a "request based" Time Division Multiplexing (TDM) scheme, wherein each Gig port has a turn on the bus every 72 cycles and each high speed Port 108 has a turn every 6 cycles. CPU processed packet data is transmitted over bubbles—free spaces occurring on the bus. Upon receiving the information for the MMU 104, the egress module 106 parses the packet data, performs table lookups, executes switch logic, modifies, aligns and further buffers the packet before the data is transmitted to the appropriate destination port 109a-109x.

In an embodiment of the invention, egress module 106 is connected to CPU processing module 111 through a 32 bit S-bus interface which the CPU uses to send requests to egress module 106. The requests are typically for reading the egress module's resources, i.e., registers, memories and/or stat counters. Upon receiving a request, the egress module 106 converts the request into a command and uses a mechanism, described in detail below, for storing and inserting CPU instructions into a pipeline wherever there is an available slot on the pipeline.

Figure 3:
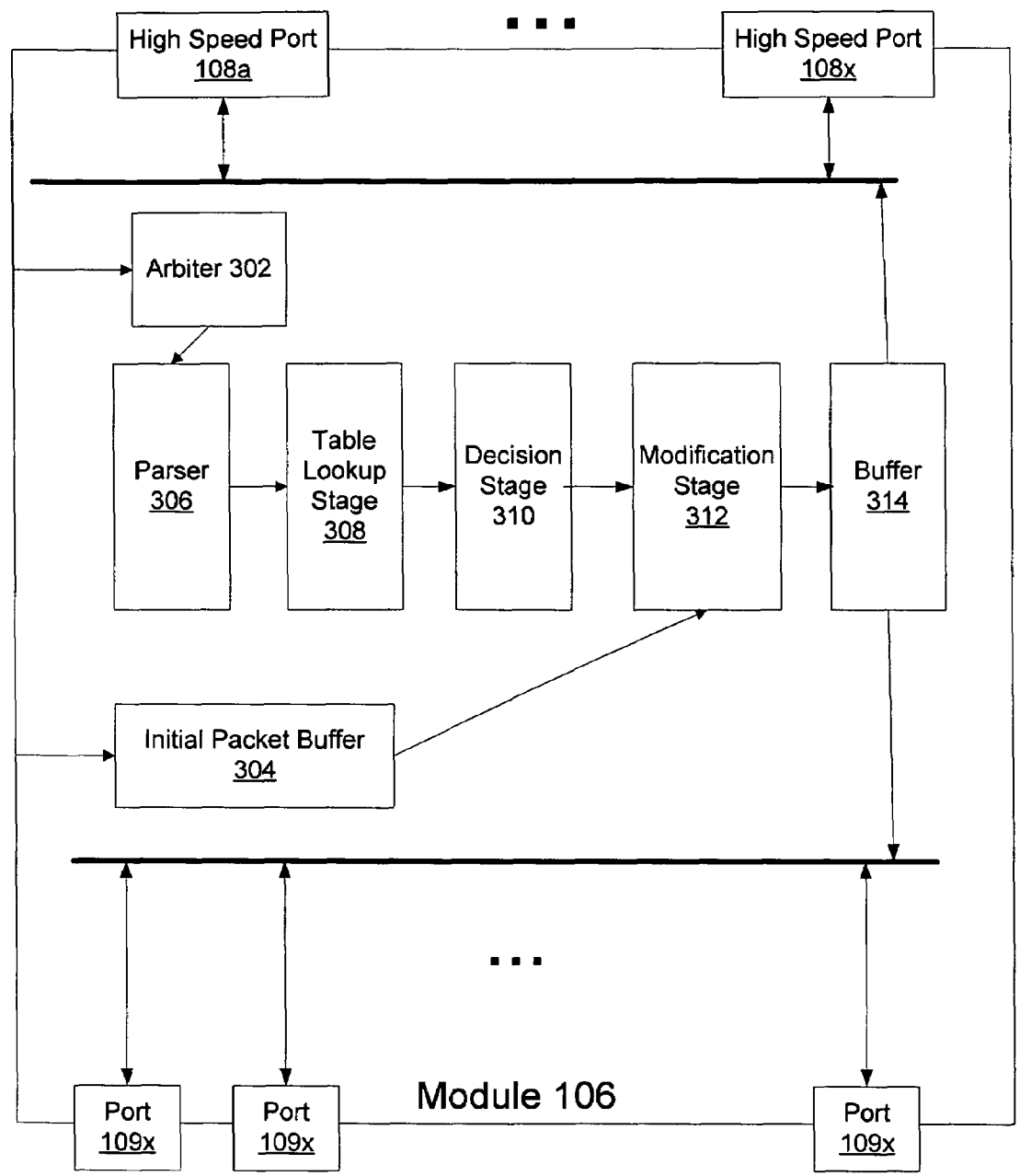
FIG. 3 illustrates a centralized egress pipeline architecture of an egress stage, according to one embodiment of the present invention.

FIG. 3 illustrates a centralized egress pipeline architecture of egress stage 106. The egress pipeline includes an arbiter 302, parser 306, a table lookup stage 308, a decision stage 310, a modification stage 312 and a data buffer 314. The arbiter 302 provides arbitration for accessing egress pipeline resources between packet data and control information from MMU 104 and information from the CPU. Parser 306 performs packet parsing for table lookups and modifications. Table lookup stage 308 performs table lookups for information transmitted from parser 306. Decision stage 310 is used for deciding whether to modify, drop or otherwise process the packet. Modification stage 312 makes modification to the packet data based on outputs from previous stages of the ingress module.

All incoming packet data from MMU 104 is transmitted to an initial packet buffer 304. In an embodiment of the invention, the initial packet buffer is 1044 bits wide and 18 words deep. Egress pipeline 300 receives two inputs, packet data and control information from MMU 104 and CPU operations from the s-bus. Initial packet buffer 304 stores packet data and keeps track of any empty cycles coming from MMU 104. Initial packet buffer 304 outputs its write address and parser 306 passes the latest write address with pipeline instructions to modification stage 314.

Arbiter 302 collects packet data and control information from MMU 104 and read/write requests to registers and memories from the CPU and synchronizes the packet data and control information from MMU 104 and writes the requests from the CPU in a holding register. Based on the request type from the CPU, arbiter 302 generates pipeline register and memory access instructions and hardware table initialization instructions. After arbiter 302 collects packet data, CPU requests and hardware table initialization messages, it generates an appropriate instruction which is transmitted to parser 306.

After receiving an instruction from arbiter 304, parser 306 parses packet data using control information and a configuration register value transmitted from arbiter 306. According to an embodiment, the packet data is parsed to obtained L4 and L3 fields which appear in the first 148 bytes of the packet.

Figure 4:
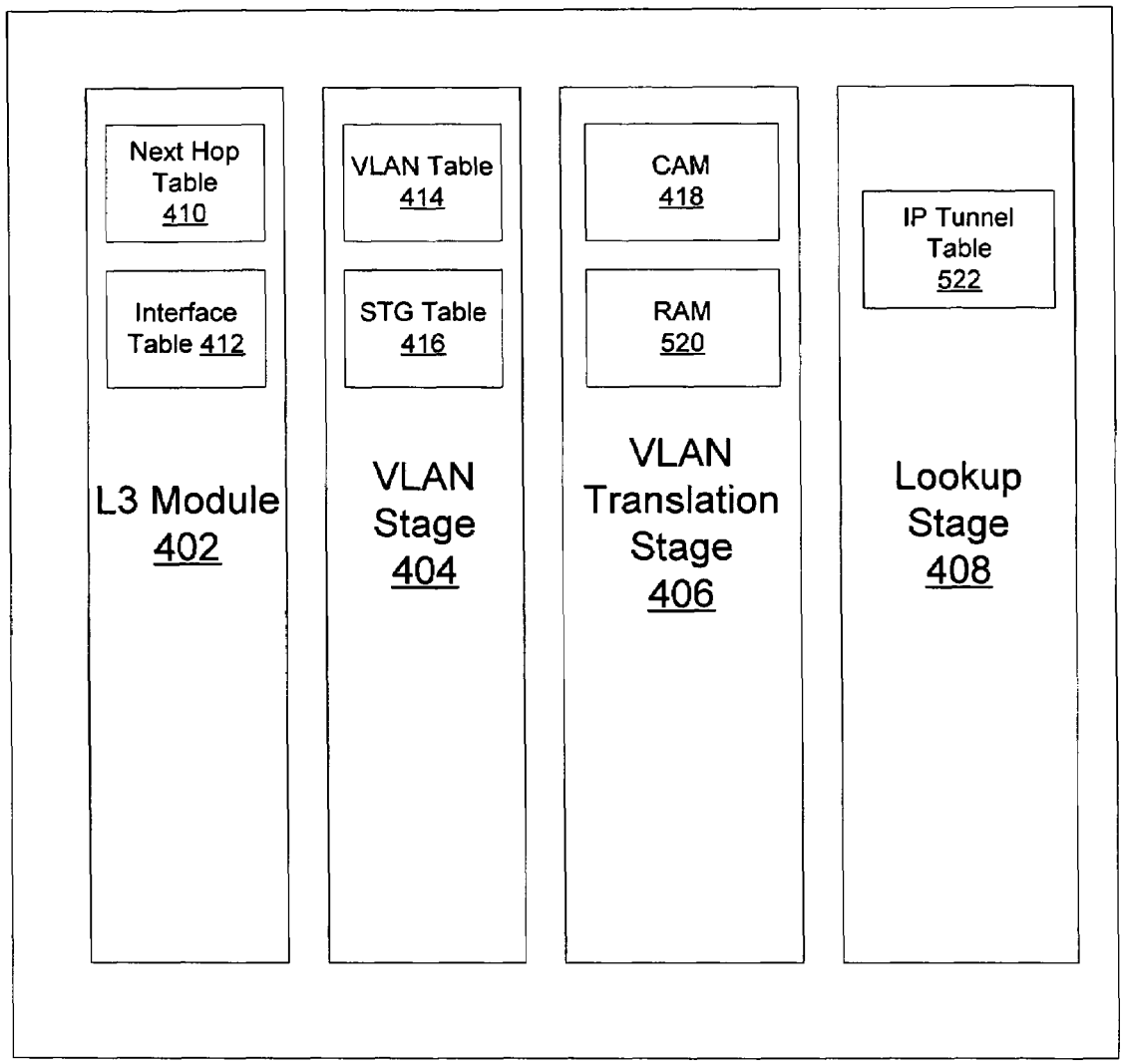
FIG. 4 illustrates a table lookup stage in the egress pipeline architecture.

Table lookup stage 308 then receives all packet fields and register values from parser 306. FIG. 4 further illustrates table lookup stage 308. Table lookup stage 308 includes a L3 Module 402, a VLAN stage 404, a VLAN translation stage 406, IP tunneling lookup stage 408. In an embodiment of the invention, L3 Module 402 includes an 8 k deep Next Hop Table 410 and a 4K deep Interface table 412. Next Hop table 410 is indexed based on a 13 bit wide next hop index from MMU 104 and Next Hop table 410 provides a MAC Address and an Interface Number that is used, depending on the type of packet, to index Interface table 412. For all Memory Read Operation and Memory Write Operation instructions, table lookup stage 308 decodes the address and writes or reads data from corresponding tables.

VLAN stage 404 is used to obtain VLAN related information and a spanning tree state of an outgoing port. VLAN stage 404 includes a VLAN table 414 and a stage (STG) table 416. VLAN table 414 is indexed based on the VLAN IDs from either the packet or Interface table 412. If a VLAN table lookup results in a "miss", i.e., an invalid VLAN, then the packet may be dropped. If the VLAN entry is valid but the outgoing port is not a member of the VLAN, then the packet may be also dropped. The VLAN table outputs a VLAN membership, untagged bitmap, and a STG group number which is used to index STG table 416. STG table 416 outputs an STG vector which contains the spanning tree state of the outgoing ports. VLAN stage 404 also determines whether the packet should be modified in egress pipeline 300 for CPU and ingress mirroring cases.

VLAN translation stage 406 translates the incoming VLAN to a new one and searches various tables. VLAN translation stage 406 includes a Content Addressable Memory (CAM) 418 and an associated Data Random Addressable Memory (RAM) 520. CAM 418 is searched with the VLAN ID and the destination port number and if an associated entry is found, an address is obtained from CAM 418 to access the associated Data RAM 520.

IP tunneling lookup stage 408 obtains a partial Tunnel IP header from appropriate tables, registers and parsed packet fields. IP tunneling lookup stage 408 includes an IP tunnel table 522 that is indexed issuing a tunnel index from interface table 412 and outputs tunnel type, among other information, which is used to distinguish among tunnel protocols that are implemented in egress pipeline 300.

Information from table lookup stage 308 is then transmitted to decision stage 310 where a decision is made as to whether to modify, drop or otherwise process the packet. For example, decision stage 310 first looks for flush bits at the beginning of the packet transmission and if the flush bits are set, the packets are marked "dropped". In an embodiment of the invention, if a flush bit for a packet is set for a packet already in transmission, the packet is completely transmitted and the next packet is flushed. In another example, MMU 104 may mark packets as Purge, Aged or Cell Error and decision stage 310 may either drop or transmit these packets but mark them as erroneous. In another example, if a VLAN translate feature is enabled, but there was a miss in CAM 418 lookup, the decision stage 310 may drop the packet if certain fields are set. Decision stage 308 also determines if the packet need to be L4 switched or L3 routed and the type of mirroring functions that need to be performed on the packets.

Modification stage 312 thereafter constructs a Tunnel IP Header and a module header for the packet, makes replacement changes in the packet and computes an IP checksum for outer and inner IP headers. Modification stage 312 receives a packet data interface from the initial buffer 304 which enables modification stage 312 to provide a read address to initial buffer 304 and in response obtain the packet data and basic control data. Modification stage 312 then generates Middle of Packet and End of Packet instructions based on the data received from initial buffer 304 and makes changes based on these commands. Modification stage 312 also receives all packet decisions and pipeline commands decision stage 310 and uses this information to make further changes to the packet. Specifically, all fields of the tunnel IP header, which need to be filled by incoming packet fields, are filled. Furthermore, an IP checksum for the tunnel IP header is computed in parallel with the header construction. Modification stage 312 further reads back packets and control information from initial buffer 304 and performs all packet modifications and replacements of fields. It outputs Cpu operations and hardware commands and data and addresses associated with them on one bus and outputs packet data and control information on another bus. Additionally, modification stage 312 performs physical encapsulation and decapsulation of headers and tag removal and insertions. If a packet is going to a high speed port, modification stage 312 converts the packet from Ethernet format to high speed format. Modification stage 312 also aligns the packet by padding packets smaller than 64 bytes and removes holes by aligning data to a 1314 bit boundary. Thereafter, a 1314 bit "complete" data word is output from modification stage 312 to the data buffer 314.

Data buffer 314 stores completed data words from modification stage 312 in memory. Before the egress pipeline sends packets out to destination ports 109a-109x, the packet data are stored in the data buffer 314 for pipeline latency and port speed matching. Data buffer 314 is capable of requesting data from MMU 104 whenever it has a free space.

Figure 5:
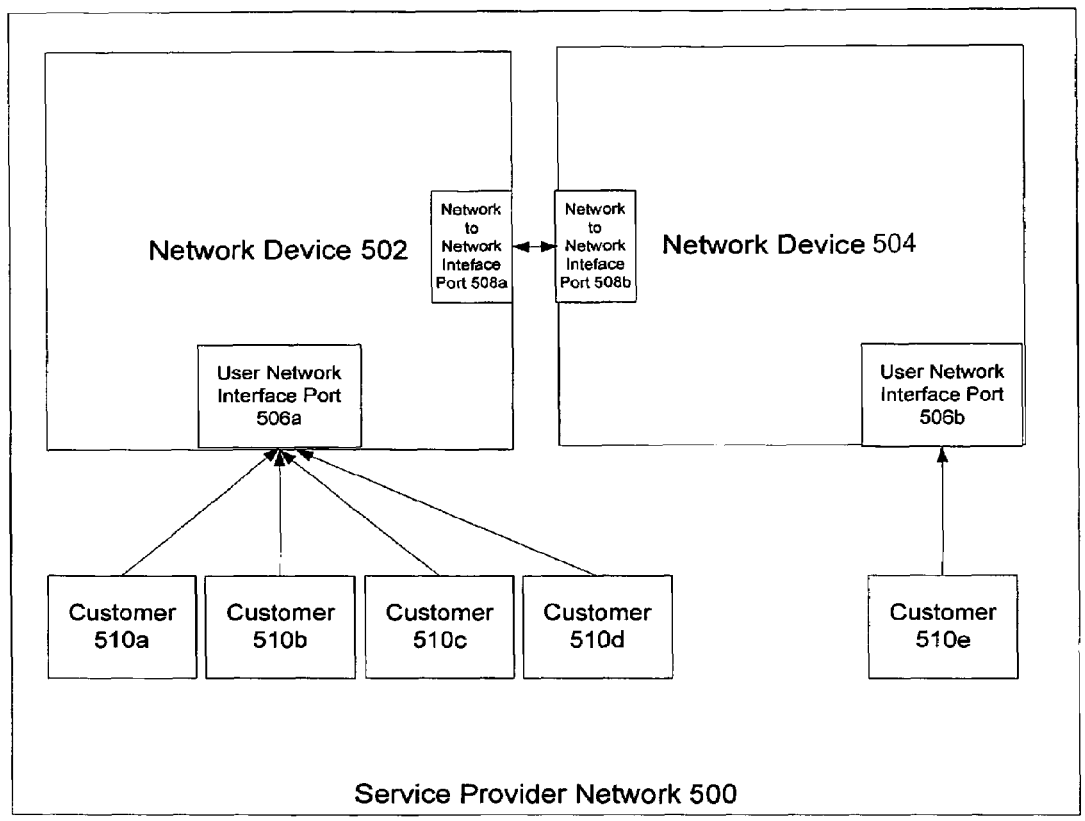
FIG. 5 illustrates an embodiment of the invention in which VLAN translation is implemented on at least two devices.
Figure 6A:
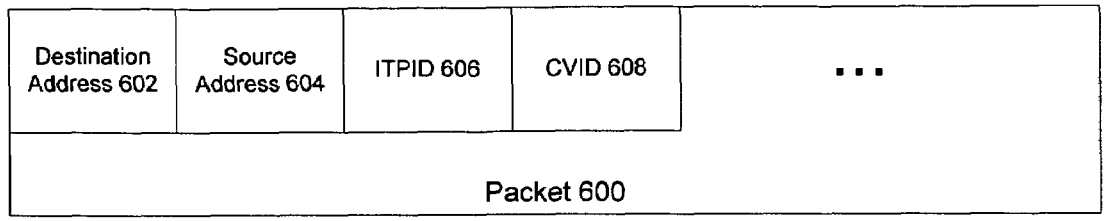
FIG. 6a illustrates a packet that is transmitted between customers in a service provider network.

FIG. 5 illustrates an embodiment of the invention in which VLAN translation is implemented on at least two network devices, as described above, used by a service provider network. The service provider network 500 includes first device 502 and a second device 504 each of which includes a user network interface port 506a and 506b for receiving and/or transmitting packets to customers 510a-510e of service provider network 500. Each of first and second devices 502 and 504 also includes a network to network interface 508a and 508b for communicating with each other. FIG. 6a illustrates a packet 600 that is transmitted between customers 510a-510e connected to service provider network 500. Packet 600 includes a destination address 602, a source address 604, an inner Internet type identifier (ITPID) 606 and a customer identifier (CVID) 608. According to FIG. 5, when packet 600 enters first device 502, packet 600, as shown in figure 6a, is translated and encapsulated with a tag that is stripped off when packet 600 is forwarded to a receiving customer. So if packet 600 is transmitted from customer 510a to customer 510e, upon receipt of packet 600 by first device 502, packet 600 is translated based on an associated service provider identifier, classified and transmitted to second device 504 where packet 500 is restored to its original state before it is transmitted out of user network interface port 506b to customer 510e. As such, neither of customers 510a nor 510e knows anything about the translation.

According to an embodiment of the invention, in order to properly classify the packet, a double tag mode must be enabled in the entire system. Thereafter, upon receipt of packet 600 on incoming user network interface port 506a, first device 502 obtains ITPID 606 from the incoming packet and compares ITPID 606 with a configured ITPID. If there is a match, first device 502 provides predefined map or translation services to the packet.

Figure 6B:
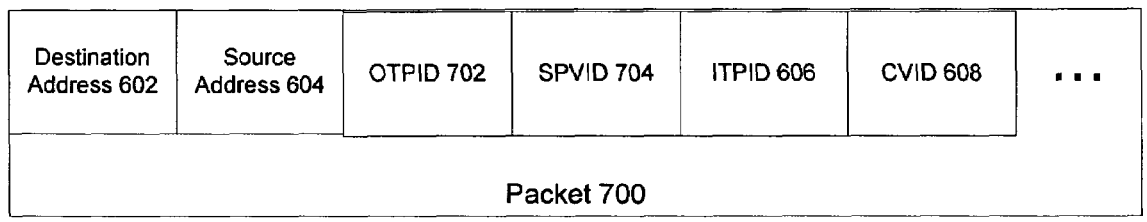
FIG. 6b illustrates one embodiment of a packet that is translated in a service provider network.
Figure 6C:
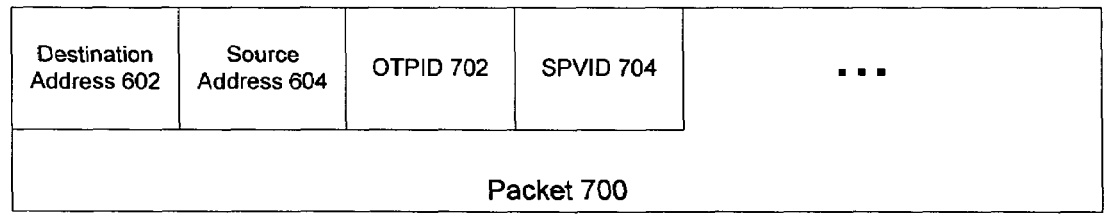
FIG. 6c illustrates another embodiment of a packet that is translated in the service provider network.

Specifically, first device 502 indexes a VLAN Translation Table, with CVID 608 and the ingress port number. First device 502 then obtains a service provider identifier and depending on the action associated with the service provider identifier, an outer Internet type identifier (OTPID) 702 and service provider identifier 704 are either added to packet 600, as shown in FIG. 6b, or used to replace ITPID 606 and CVID 508, as shown in FIG. 6c. As shown in FIG. 6c, for those service providers that want to save bandwidth on packets that are transmitted in their service provider network 500, OTPID 702 and service provider identifier 704 may replace ITPID 606 and CVID 608, instead of being added to packet 600. It should be noted that each device 502 and 504 may include multiple service provider identifiers based on different parameters, for example based on protocols or ports, wherein each of the service provider identifiers has it own set of parameters. So anytime a packet, for example packet 600, is received on user network interface port 506a and 506b, the packet is either translated by replacing ITPID 606 and CVID 608 that are already in packet 600 with OTPID 702 and service provider identifier 704 obtained from the VLAN translation table or by inserting OTPID 702 and service provider identifier 704 into packet 600.

Thereafter, the packet is placed on higig port, wherein the higig header includes service provider identifier 704. Upon arriving at the egress device, i.e., second device 504, second device 504 indexes an egress VLAN translation table using the egress port and the service provider identifier. Second device 504 then obtains the corresponding CVID 608, removes the added OTPID 702 and service provider identifier 704 from the packet and puts CVID 608 back into the packet before the packet is sent out to an egress port. Specifically, at an egress port, for example port 506b, second device 504 indexes the egress VLAN translation table to obtain the appropriate CVID. Thereafter, second device 504 examines a VLAN table to determine if a un-tag bit map is set for the egress port. If it is, second device 504 removes OTPID 702 and service provider identifier 704 from the packet. According to one embodiment of the invention, if there is a miss when second device indexes the egress VLAN translation table, second device 504 still removes OTPID 702 and service provider identifier 704 from the packet.

In one embodiment of the invention, on each user network interface port 506, device 502 or 504 parses one tag from the packet, on each network to network port 508, device 502 or 504 parses two tags from the packet. In an embodiment, a port on each of device 502 or 504 may be programmed as a network to network port 508. Furthermore, an ingress tag in the module header of each packet is set to either switch or mirror the packet. For switching, the ingress tag bit signifies that the packet has two tags and is identified by a two tags field. For mirroring, the ingress tag bit signifies that the packet came into the device as tagged. As such, if the packet entered device 502 or 504 with two tags or if the SPYID is appended to the packet, the set two tags field is set at the ingress device. Thereafter, at an egress or high speed port, if the two tags field is set, one tag is parsed from the packet.

In an embodiment of the invention, on an ingress port in device 502 or 504, device 502 or 504 determines if the port is a network to network interface port 508 and if a predefined OTPID is equal to the OTPID in the packet, device 502 or 504 initializes an identifier counter and the two tags field. Then based on an outer identifier, device 502 or 504 determines if a VLAN translation disable function is enabled, and if it is, device 502 or 504 does not change the packet and sets an OTPID match field. Device 502 or 504 also determines if a VLAN translation replace function is enabled based on the outer identifier, and if it is, device 502 or 504 sets a MMU identifier to a VLAN translation identifier and sets an OTPID match field. Device 502 or 504 further determines if a VLAN translation add function is enabled based on the outer identifier, and if it is, device 502 or 504 determines that this is an illegal case and sets the OTPID match field. Device 502 or 504 also determines if a VLAN translation miss function is enabled based on the outer identifier, and if it is, device 502 or 504 does not change the packet and sets the OTPID match field.

Thereafter, device 502 or 504 determines if the packet ITPID 606 is equal to a predefined ITPID and, if it is, sets an ITPID match field. At this point, if the OTPID match field is also set, device 502 and 504 sets the two tags field or else it initializes the two tags field. Device 502 or 504 then determines if the ingress port is user network interface port 506. If it is, device 502 or 504 determines if the VLAN translation disable function is enabled based on an inner identifier, and if it is, device 502 or 504 sets the MMU identifier with the VLAN identifier and sets the identifier counter. Device 502 or 504 also determines if the VLAN translation replace function is enabled based on the inner identifier, and if it is, device 502 or 504 sets the MMU identifier to the VLAN translation identifier and initializes the identifier counter. Device 502 or 504 further determines if a VLAN translation add function is enabled based on the inner identifier, and if it is, device 502 or 504 sets the MMU identifier to the VLAN translation identifier and sets the identifier counter and the two tags field. Device 502 or 504 further determines if a VLAN translation miss function is enabled based on the inner identifier, and if it is, device 502 or 504 sets the MMU identifier to a port identifier and sets the identifier counter and the two tags field.

Thereafter, ingress device 502 or 504 determines if the OTPID match field and ITPID match field are set, and if they are not, device 502 or 504 identifies the packet as untagged, initializes the two tags field, sets the MMU identifier to the VLAN identifier and sets the identifier counter.

When the packet travels to a high speed port, the associated device determines if the 2 tags field in the high speed module header is set, parses one tag in the packet and sets the identifier counter. At the egress port, if the two tags field in the packet is set, the egress port parses one tag in the packet. The egress port then determines if the identifier counter is set, and if it is not, replaces predefined fields in the packet.

If the packet is to be ingress mirrored, device 502 or 504 determines if the source port is network to network port 508. Device 502 or 504 further determines if the packet OTPID is equal to a predefined OTPID and if it is, sets the two tags field in the packet's high speed module header. If on the other hand the packet OTPID is not equal to a predefined OTPID, device 502 or 504 initializes the two tags field in the packet's high speed module header. Then device 502 or 504 determines if the source port is user network interface port 506 and sets the two tags field in the packet's high speed module header.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

With respect to the present invention, network devices may be any device that utilizes network data, and can include switches, routers, bridges, gateways or servers. In addition, while the above discussion specifically mentions the handling of packets, packets, in the context of the instant application, can include any sort of datagrams, data packets and cells, or any type of data exchanged between network devices.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A method for implementing virtual local area network (VLAN) translation on a packet, the method comprises:
    receiving and transmitting packets to customers of a network at a user network interface port;
    communicating with a second network device in the network at a network to network interface port;
    classifying a packet received at the user network interface port;
    translating the packet based on a predefined provider field associated with the packet;
    encapsulating the packet with at least one tag that is removed when the packet is transmitted to a customer; and
    indexing, when a network device is configured as an egress device, an egress table using predefined fields to obtain a corresponding customer identifier, removing a second identifier and the predefined provider identifier inserted in the packet and inserting the customer identifier in the packet.

2. The method according to claim 1, further comprising enabling a tag mode prior to classification of the packet.

3. The method according to claim 1, further comprising comparing a first identifier in the packet with a configured first identifier and, if there is a match, providing predefined services.

4. The method according to claim 1, further comprising indexing a table to obtain the predefined provider field and depending on an action associated with the predefined provider field, inserting a second identifier and the predefined provider field in the packet or replacing a first identifier and a customer identifier field in the packet with the second identifier and the predefined provider field.

5. The method according to claim 1, further comprising examining the egress table to determine if a bit map is set for an egress port to which the packet is being transmitted, and if it is, removing the second identifier and the predefined provider identifier inserted in the packet and inserting the customer identifier in the packet.

6. The method according to claim 1, further comprising removing the second identifier and the predefined provider identifier inserted in the packet when the network device is unable to obtain the corresponding customer identifier.

7. The method according to claim 1, further comprising parsing one tag from the packet at the user network interface port.

8. The method according to claim 1, further comprising parsing two tags from the packet at the network to network interface port.

9. An apparatus for implementing virtual local area network (VLAN) translation on a packet, the apparatus comprising:
    means for receiving and transmitting packets to customers of a network at a user network interface port;
    communicating means for communicating with a second network device in the network at a network to network interface port;
    classifying means for classifying a packet received at the user network interface port;
    translating means for translating the packet based on a predefined provider field associated with the packet;
    encapsulating means for encapsulating the packet with at least one tag that is removed when the packet is transmitted to a customer; and
    indexing means for indexing, when a network device is configured as an egress device, an egress table using predefined fields to obtain a corresponding customer identifier, removing a second identifier and the predefined provider identifier inserted in the packet and inserting the customer identifier in the packet.

10. A network device for implementing virtual local area network (VLAN) translation on a packet, the network device comprising:
    a user network interface port configured to:
      receive and transmit packets to customers of a network;
      classify a received packet;
      translate the received packet based on a predefined provider field associated with the received packet; and
      encapsulate the received packet with a tag, the tag being based on the classification and the translation; and
      remove the tag when the received packet is transmitted from the network interface port to a customer; and
    a network to network interface port configured to communicate with a second network device in the network,
    wherein the network device is configured as an egress device and is configured to index an egress table using predefined fields to obtain a corresponding customer identifier, to remove a second identifier and the predefined provider identifier inserted in the packet and to insert the customer identifier in the packet.

11. The network device according to claim 10, wherein the network device is configured to include a tag mode which is enabled prior to classification of the packet.

12. The network device according to claim 10, wherein upon receipt of the packet the network device is configured to compare a first identifier in the packet with a configured first identifier and, if there is a match, to provide predefined services.

13. The network device according to claim 10, wherein the network device is configured to index a table to obtain the predefined provider field and, depending on an action associated with the predefined provider field, the network device is configured to insert a second identifier and the predefined provider field in the packet or to replace a first identifier and a customer identifier field in the packet with the second identifier and the predefined provider field.

14. The network device according to claim 10, wherein the network device comprises a plurality of predefined provider fields, at least one of which has a predefined set of parameters and at least one associated action.

15. The network device according to claim 10, wherein the network device is configured to examine the egress table to determine if a bit map is set for an egress port to which the packet is being transmitted, and if it is, to remove the second identifier and the predefined provider identifier inserted in the packet and to insert the customer identifier in the packet.

16. The network device according to claim 10, wherein the network device is configured to remove the second identifier and the predefined provider identifier inserted in the packet when the network device is unable to obtain the corresponding customer identifier.

17. The network device according to claim 10, wherein the network device is configured to parse one tag from the packet at the user network interface port.

18. The network device according to claim 10, wherein the network device is configured to parse two tags from the packet at the network to network interface port.

19. The network device according to claim 10, wherein the network device is configured to program any port as the network to network interface port.

* * * * *

UNITED STATES PATENT AND TRADEMARK OFFICE
CERTIFICATE OF CORRECTION

| | | |
|---|---|---|
| PATENT NO. | : 7,830,892 B2 | Page 1 of 1 |
| APPLICATION NO. | : 11/289370 | |
| DATED | : November 9, 2010 | |
| INVENTOR(S) | : Mohan Kalkunte et al. | |

It is certified that error appears in the above-identified patent and that said Letters Patent is hereby corrected as shown below:

On title page, in field (75), in "Inventors", in column 1, line 4, delete "Gurumurthy Yelewarapu" and insert -- Gurumurthy Yeleswarapu --, therefor.

Signed and Sealed this
Twenty-second Day of February, 2011

David J. Kappos
*Director of the United States Patent and Trademark Office*